United States Patent
Lünebach et al.

(10) Patent No.: US 11,215,262 B2
(45) Date of Patent: Jan. 4, 2022

(54) HYDRAULIC BEARING FOR SUPPORTING AN ASSEMBLY OF A MOTOR VEHICLE

(71) Applicant: VIBRACOUSTIC GMBH, Darmstadt (DE)

(72) Inventors: Mark Lünebach, Stuttgart (DE); Roland Holz, Fürth (DE)

(73) Assignee: Vibracoustic SE, Darmstadt (DE)

( * ) Notice: Subject to any disclaimer, the term of this patent is extended or adjusted under 35 U.S.C. 154(b) by 224 days.

(21) Appl. No.: 16/487,580

(22) PCT Filed: Feb. 16, 2018

(86) PCT No.: PCT/EP2018/053936
§ 371 (c)(1),
(2) Date: Feb. 26, 2020

(87) PCT Pub. No.: WO2018/153794
PCT Pub. Date: Aug. 30, 2018

(65) Prior Publication Data
US 2020/0182328 A1 Jun. 11, 2020

(30) Foreign Application Priority Data

Feb. 22, 2017 (DE) ..................... 10 2017 103 603.2

(51) Int. Cl.
*F16F 13/10* (2006.01)
(52) U.S. Cl.
CPC .......... *F16F 13/107* (2013.01); *F16F 13/102* (2013.01); *F16F 2228/04* (2013.01); *F16F 2230/20* (2013.01)
(58) Field of Classification Search
CPC .... F16F 13/107; F16F 13/102; F16F 2228/04; F16F 2230/20; F16F 13/106; F16F 9/342; B60K 5/1208
See application file for complete search history.

(56) References Cited

U.S. PATENT DOCUMENTS

| 4,037,262 A | 7/1977 | Kabayashi et al. |
| 4,697,793 A | 10/1987 | Reuter et al. |
(Continued)

FOREIGN PATENT DOCUMENTS

| CN | 102168737 A | 8/2011 |
| CN | 103069192 A | 4/2013 |
(Continued)

OTHER PUBLICATIONS

Chinese Search Report, 2018800245185, dated Oct. 27, 2020.
(Continued)

*Primary Examiner* — Xuan Lan Nguyen
(74) *Attorney, Agent, or Firm* — Fishman Stewart PLLC

(57) ABSTRACT

A hydraulic bearing for supporting an assembly of a motor vehicle includes a carrying bearing portion and a support portion. In embodiments, a working chamber that is fillable with hydraulic fluid is formed in the carrying bearing portion, and a compensating chamber that is fillable with hydraulic fluid is formed in the support portion. A nozzle disc, through which the flow can pass and which delimits the working chamber from the compensating chamber, may be arranged between the carrying bearing portion and the support portion, and a damping duct for the fluidic communication of the working chamber with the compensating chamber may be formed in the nozzle disc. In embodiments, the two chambers, the damping duct, and the hydraulic fluid may form a first damping system for damping vibrations of lower frequencies and a second damping system may be formed for damping vibrations of higher frequencies.

7 Claims, 2 Drawing Sheets

(56) References Cited

U.S. PATENT DOCUMENTS

| | | | |
|---|---|---|---|
| 5,340,094 A | | 8/1994 | Schyboll et al. |
| 5,433,421 A | * | 7/1995 | Ishiyama ............... F16F 13/107 |
| | | | 248/559 |
| 5,667,205 A | * | 9/1997 | Mutoh .................. F16F 13/107 |
| | | | 267/140.13 |
| 8,240,644 B2 | | 8/2012 | Lemaire et al. |
| 8,430,373 B2 | | 4/2013 | Nishi et al. |
| 9,022,368 B2 | | 5/2015 | Marienfeld et al. |
| 9,347,516 B2 | | 5/2016 | Kadowaki |
| 9,394,964 B2 | * | 7/2016 | Yasuda ................. F16F 13/107 |
| 2016/0327116 A1 | * | 11/2016 | Kim ...................... F16F 13/266 |

FOREIGN PATENT DOCUMENTS

| | | |
|---|---|---|
| CN | 103363012 A | 10/2013 |
| DE | 2632670 C2 | 1/1983 |
| DE | 3501628 A1 | 7/1986 |
| DE | 4218110 A1 | 10/1993 |
| DE | 102009044773 A1 | 6/2011 |
| DE | 102010060885 A1 | 3/2012 |
| DE | 102010045277 B4 | 9/2013 |
| DE | 102012006282 A1 | 10/2013 |
| DE | 112013002243 T5 | 3/2015 |
| DE | 102014224244 A1 | 6/2016 |
| EP | 1526303 A1 | 4/2005 |
| EP | 2180207 B1 | 9/2011 |
| EP | 2644934 A2 | 10/2013 |
| EP | 2711585 A1 | 3/2014 |
| JP | 2003-148548 A | 5/2003 |
| JP | 2005127519 A | 5/2005 |
| WO | 2011/067007 A1 | 6/2011 |

OTHER PUBLICATIONS

Chinese Office Action, 201880024518.5, dated Nov. 3, 2020.
Translated Chinese Office Action, 201880024518.5, dated Nov. 3, 2020.
International Search Report PCT/EP2018/053936, dated May 29, 2018.
German Office Action, 18705919.1, dated Jun. 18, 2021.
Machine Translation of German Office Action, 18705919.1, dated Jun. 18, 2021.
Second Chinese Office Action, 201880024518.5, dated Jul. 21, 2021.
Translation of Second Chinese Office Action, 201880024518.5, dated Jul. 21, 2021.

* cited by examiner

HYDRAULIC BEARING FOR SUPPORTING AN ASSEMBLY OF A MOTOR VEHICLE

CROSS-REFERENCE TO RELATED APPLICATIONS

This application is a National Stage Patent Application of International Patent Application No. PCT/EP2018/053936, filed Feb. 16, 2018, which claims the benefit of German Application Serial No. 10 2017 103 603.2, filed Feb. 22, 2017, the contents of each are incorporated by reference in their entireties.

TECHNICAL FIELD

The invention relates to a hydromount for mounting a powertrain unit of a motor vehicle according to the preamble of claim 1.

BACKGROUND

Hydromounts for mounting a powertrain unit of a motor vehicle are known. The hydromounts are used to mount the powertrain unit, e.g. of a combustion engine, on a body carrier of the motor vehicle. The hydromounts are usually designed as hydraulic elastic mounts. When the vehicle is in operation, vibrations are generated due to components of the powertrain unit moving in rotation and/or translation. These vibrations must be damped, preferably eliminated, when the powertrain unit is attached to the body carrier in order to reduce noise. For this purpose, hydromounts are arranged between the body carrier and the powertrain unit.

In addition to the possible noise of the hydromount, in developing hydromounts a possible cavitation must be taken into account, which may occur due to an exchange of hydraulic fluid between two chambers of the hydromount. Depending on the vibrations acting on the hydromount, bubbles may be generated in the hydraulic fluid which, in addition to a loud noise during bursting, may damage the hydromount. The two chambers are essentially separated from each other by means of a diaphragm, wherein the hydraulic fluid is exchanged via a damping channel connecting the two chambers.

The publication DE 11 2013 002 243 T5 discloses a hydromount for mounting a powertrain unit of a motor vehicle having a pressure relief valve. The pressure relief valve is integrated into the diaphragm.

Patent specification DE 10 2010 045 277 B4 discloses a hydromount for mounting a powertrain unit of a motor vehicle, the diaphragm of which is corrugated and has relief slots which become effective in the event of excessive pressure differences between the chambers.

The patent specification EP 2 180 207 B1 reveals a hydromount for mounting a powertrain unit of a motor vehicle which has a damping channel connecting the working chamber with a compensation chamber and an overflow channel connecting the chambers with intermediate chambers, either the damping channel and the overflow channel or only the overflow channel being open for damping.

The publication JP 2003148548 A1 discloses a hydromount for mounting a powertrain unit of a motor vehicle, wherein a short-circuit valve is opened if a vacuum in the working chamber is greater than a preset vacuum in the working chamber.

The publications DE 35 01 628 C3, DE 26 32 670 C2 and DE 42 18 110 A1 disclose hydromounts for mounting a motor vehicle unit which have a bypass parallel to the damping channel in such a way that, the pressure in the chambers being the same, a different pressure reduction is possible when the diaphragm is loaded.

SUMMARY

It is the problem of this invention to provide an improved hydromount for mounting a powertrain unit of a motor vehicle.

In accordance with the invention, the problem is solved by a hydromount for mounting a powertrain unit of a motor vehicle with the features of claim 1. Advantageous embodiments with functional and non-trivial further improvements of the invention are indicated in the dependent claims.

A hydromount for mounting a powertrain unit of a motor vehicle in accordance with the invention has a carrier mount portion and a support portion. A working chamber which can be filled with hydraulic fluid is formed in the carrier mount portion, and a compensation chamber which can be filled with hydraulic fluid is formed in the support portion, wherein between the carrier mount portion and the support portion a nozzle disc is arranged which can be flowed through and which delimits the working chamber from the compensation chamber. A damping channel for fluidic communication of the working chamber with the compensation chamber is formed in the nozzle disc, wherein the two chambers, the damping channel and the hydraulic fluid form a first damping system for damping vibrations, in particular with lower frequencies. The hydromount has a second damping system for damping vibrations with higher frequencies. The second damping system has an overflow connection between the compensation chamber and an absorber channel designed to absorb idling vibrations. In other words, an overflow of hydraulic fluid from the compensation chamber into the absorber channel is realized. The advantage is the creation of a wider characteristic curve spread. In other words, the damping extends over a larger frequency range. A further advantage is the accompanying reduction of a maximum pressure formed in the hydromount, thereby significantly reducing the tendency to cavitation. This means that the hydromount according to the invention has an increased service life compared to a prior art hydromount. The hydromount according to invention achieves a better driving comfort and a reduction of noise at the same time.

In order to achieve a cost-effective hydromount, the overflow connection is designed in the form of a relief groove. The relief groove may be formed by a cost-effective milling process, for instance.

In a further design of the hydromount according to the invention, the overflow connection is formed on a disc surface of the clamping disc facing away from the diaphragm. The advantage of this design is on the one hand in the orientation of the overflow connection directly facing the compensation chamber, and on the other hand in the fact that it cannot be covered or at least partially closed by the movable diaphragm. Thus, overflow is possible without any potential impairment of an overflow quantity.

In particular, three overflow connections formed at uniform intervals from each other have proven to be particularly effective in achieving noise reduction.

In a further embodiment of the hydromount according to the invention, the clamping disc has a pin for centering the cover disc and the diaphragm.

If the pin is hollow-cylindrical and concentric with the absorber channel, the overflow connection has to be arranged on the pin, wherein a direct connection of the relief groove with the absorber channel and the compensation chamber is established, in particular in the case of the design in the form of a relief groove.

BRIEF DESCRIPTION OF THE DRAWINGS

Further advantages, features and details of the invention result from the following description of preferred exemplary embodiments as well as from the drawings. The features and combinations of features mentioned above in the description as well as the features and combinations of features mentioned below in the figure description and/or displayed only in the figures can be used not only in the combination indicated in each case, but also in other combinations or individually without departing from the scope of the invention. Identical or functionally identical elements are provided with identical reference signs. Shown are.

DETAILED DESCRIPTION

Figure 1:
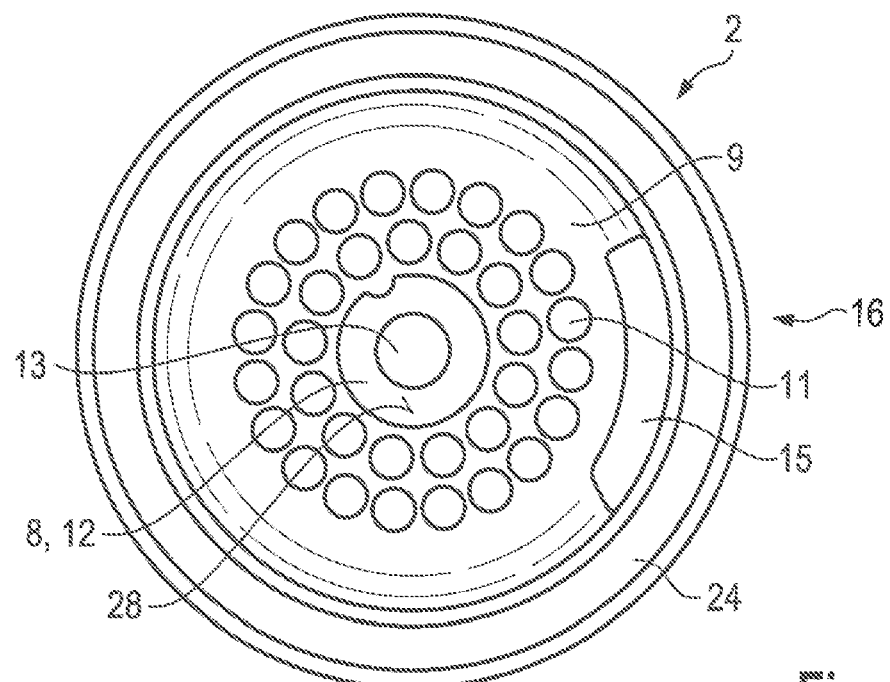
FIG. 1 a plan view of a nozzle disc of a hydromount according to prior art.
Figure 2:
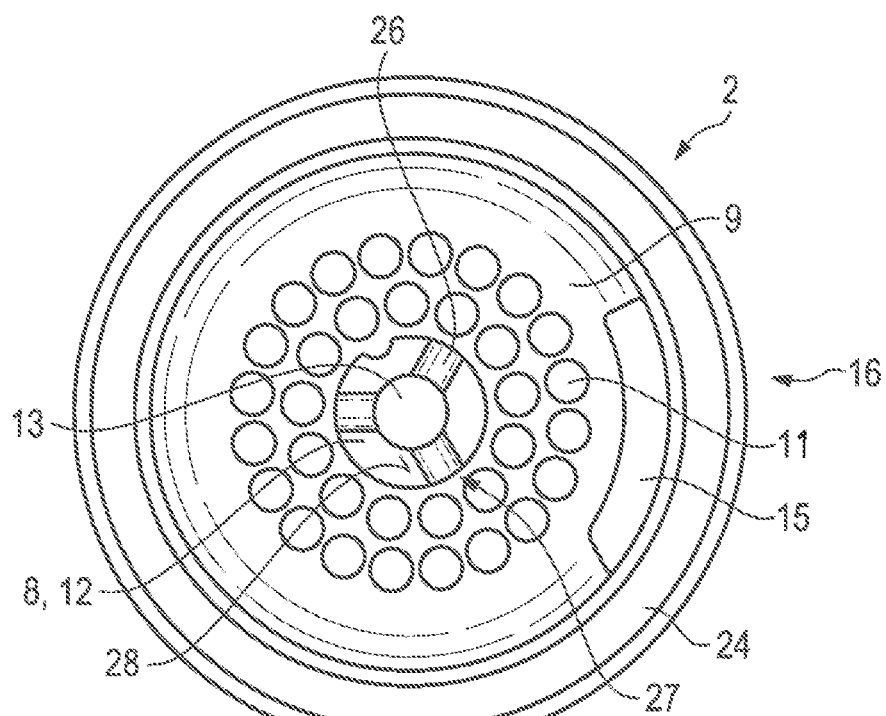
FIG. 2 a plan view of the nozzle disc of a hydromount according to the invention, and FIG. 3 a sectional view of the hydromount according to the invention.
Figure 3:
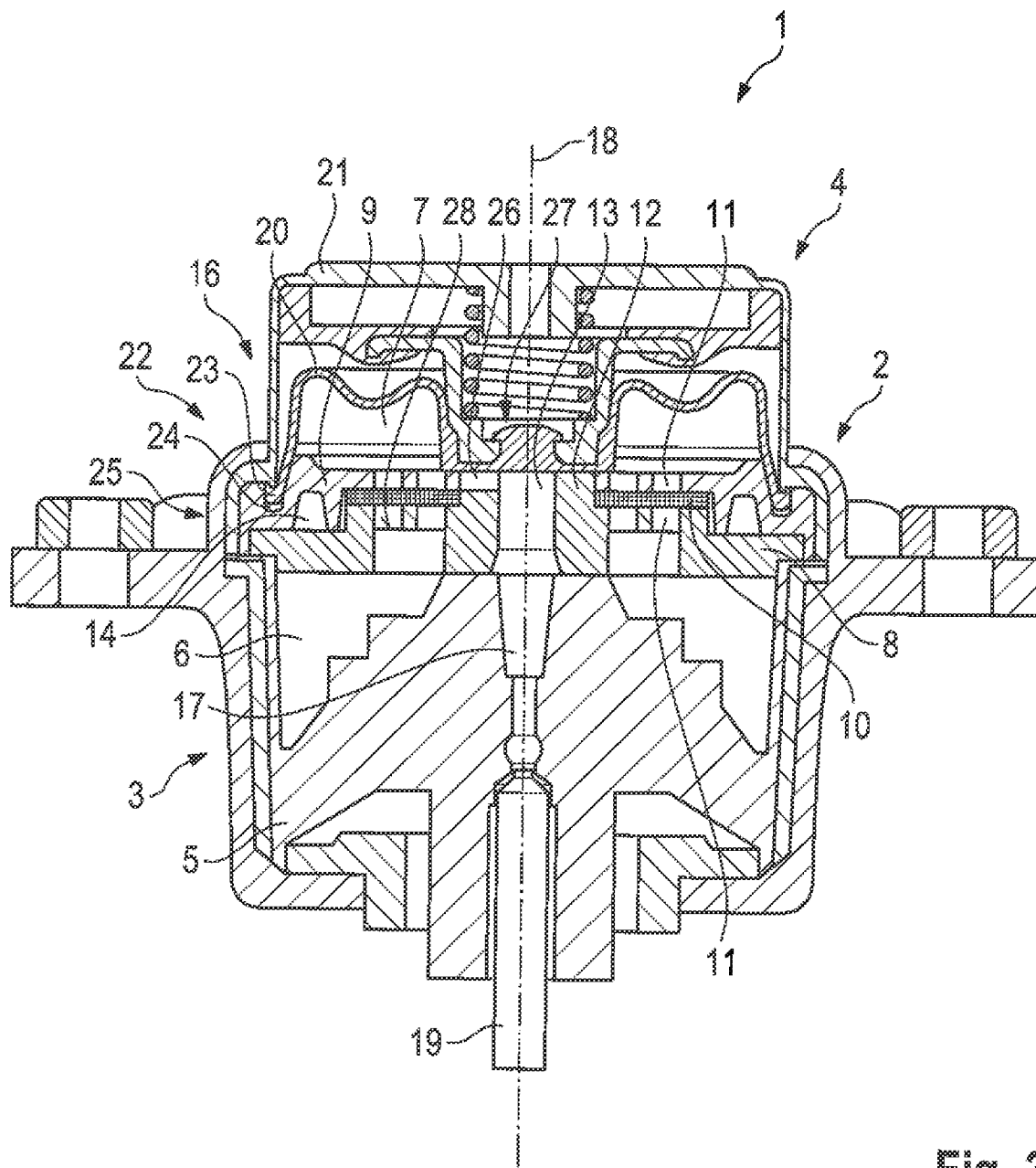

A hydromount 1, designed in accordance with prior art, for mounting a powertrain unit of a motor vehicle, which is not illustrated in detail, has a nozzle disc 2 of the hydromount 1 shown in FIG. 1. FIG. 2 shows the nozzle disc 2 of the hydromount 1 according to the invention. The hydromount 1 according to the invention is shown in a sectional view in FIG. 3.

The hydromount 1 comprises a carrier mount portion 3 and a support portion 4 which are connected to each other by an elastic support spring 5 made of an elastomeric material. A working chamber 6 is formed in the carrier mount portion 3, which is separated from a compensation chamber 7 of the support portion 4 by means of the nozzle disc 2. The two chambers 6, 7 are connected to each other via the nozzle disc 2.

The nozzle disc 2 is designed in three parts and has a clamping disc 8, a cover disc 9 and a diaphragm 10 arranged between the clamping disc 8 and the cover disc 9, the diaphragm being arranged in the nozzle disc 2 such that it can vibrate.

The clamping disc 8 and the cover disc 9 are arranged coaxially and have communication openings 11 completely penetrating them, the communication openings 11 being positioned congruently and separated from each other by means of the diaphragm 10. For radial and axial positioning of the cover plate 9 and the diaphragm 10, the clamping disc 8 has a hollow cylindrical pin 12 with a passage opening 13.

Between the clamping disc 8 and the cover disc 9 a damping channel 14 is formed which is designed for the overflow of hydraulic fluid from the working chamber 6 into the compensation chamber 7 and vice versa. On its side facing the compensation chamber 7, the damping channel 14 has a through-flow opening 15 which is formed in the cover disc 9. A further through-flow opening not shown in detail is formed in the clamping disc 8 and faces the working chamber 6. Hydraulic fluid can flow from compensation chamber 7 into the damping channel 14 via the flow-through opening 15 and from there via the further flow-through opening into the working chamber 6 and back again. Thus a first damping system 16 is available, comprising the chambers 6, 7, the damping channel 14 as well as the hydraulic fluid guided in the chambers 6, 7 and in the damping channel 14, which is designed for damping vibrations with large amplitudes and lower frequencies.

An absorber channel 17 of the hydromount 1 is provided for absorbing idling vibrations of a powertrain unit designed as a combustion engine, which is concentric to a longitudinal axis 18 of hydromount 1. The absorber channel 17 can be opened or closed with the aid of a plunger 19, which can be moved axially along the longitudinal axis 18, accommodated in the absorber channel 17. The hydromount 1 is designed rotationally symmetrical with respect to the longitudinal axis 18.

A rolling bellows 20 associated with the compensation chamber 7 can expand or contract depending on the load on the hydromount 1. Additionally, the rolling bellows 20 serves as a seal between the nozzle disc 2 and a cover 21 of the support portion 4 and is designed as a rubber diaphragm. For this purpose, on its outer circumference 22, it has a bead 23 which is accommodated in a circumferential groove 24 of the nozzle disc 2. The circumferential groove 24 is formed in an outer section 25 of the nozzle disc 2.

The cover 21 is designed such that it radially encloses the nozzle disc 2 and the rolling bellows 20. In the area of the circumferential groove 23, the cover 21 is supported on the nozzle plate 2 in the direction of the longitudinal axis 18 of the hydromount 1. Depending on the load exerted on the hydromount 1, a contact can be established between the cover 21 and the nozzle disc 2, which may cause a metallic noise. Furthermore, a metallic noise may be caused by the diaphragm 10 hitting the clamping disc 8 and the cover disc 9.

In order to reduce metallic noise, the nozzle disc 2 has three relief grooves 26. The relief grooves 26 are formed on a disc surface 28 of the clamping disc 8 facing away from the diaphragm 10 at the pin 12. The relief grooves 26 connect the absorber channel 17 with the compensation chamber 7, thereby forming a second damping system 27, which comprises, in addition to the hydraulic fluid, the compensation chamber 7, the absorber channel 17 and the relief grooves 26. The second damping system 27 is adapted to higher frequencies than those detected by the first damping system 16. It is not absolutely necessary to form three relief grooves 26. However, three relief grooves 26 and their uniform arrangement at a distance of 120° to each other has been proven as particularly effective.

Advantageously, the relief grooves 26 may be milled.

With the aid of the relief grooves 26, a significantly wider spread of a characteristic curve of a so-called loss angle ☐ over the frequency f of the hydromount 1 in accordance with the invention is obtained compared to the prior art hydromount 1. The two damping systems 16, 27 result in a significantly broader damping characteristic than is known from prior art.

The invention claimed is:

1. A hydromount for mounting a powertrain unit of a motor vehicle, comprises: a carrier mount portion and a support portion, wherein a working chamber for a hydraulic fluid is formed in the carrier mount portion and a compensation chamber for a hydraulic fluid is formed in the support portion, wherein between the carrier mount portion and the support portion a nozzle disc permits flow and delimits the working chamber from the compensating chamber, wherein the nozzle disc includes a damping channel for fluidic communication of the working chamber with the compensation chamber, wherein the working chamber, the compensating chamber, the damping channel and the hydraulic fluid form a first damping system for damping vibrations with lower frequencies, wherein a second damping system is formed for damping vibrations with higher frequencies, wherein the second damping system has an overflow connection between the compensation chamber and an absorber channel to absorb idling vibrations, and wherein a plunger is accommodated in the absorber channel, the plunger movable axially along a longitudinal axis of the hydromount, the plunger aiding in opening and/or closing the absorber channel.

2. The hydromount according to claim 1, wherein the overflow connection is configured as a relief groove.

3. The hydromount according to claim 1, wherein the overflow connection is formed on a disc surface of a clamping disc, the disc surface being formed to face away from a diaphragm.

4. The hydromount according to claim 3, wherein the clamping disc has three overflow connections.

5. The hydromount according to claim 3, wherein at least two overflow connections are formed, the at least two overflow connections having uniform distances to one another.

6. The hydromount according to claim 1, wherein a clamping disc has a pin for centering a cover disc and a diaphragm.

7. The hydromount according to claim 6, wherein the pin is hollow-cylindrical and concentric with the absorber channel of the second damping system.

\* \* \* \* \*